United States Patent
Reynolds et al.

(10) Patent No.: US 12,239,062 B1
(45) Date of Patent: Mar. 4, 2025

(54) PLANTER CONTAINER

(71) Applicants: Joseph Reynolds, New Castle, PA (US); Jill Schnarrs, New Castle, PA (US)

(72) Inventors: Joseph Reynolds, New Castle, PA (US); Jill Schnarrs, New Castle, PA (US)

( * ) Notice: Subject to any disclaimer, the term of this patent is extended or adjusted under 35 U.S.C. 154(b) by 0 days.

(21) Appl. No.: 18/368,778

(22) Filed: Sep. 15, 2023

(51) Int. Cl.
*A01G 9/02* (2018.01)

(52) U.S. Cl.
CPC .................................. *A01G 9/023* (2013.01)

(58) Field of Classification Search
CPC ................ A01G 9/023; A01G 31/06
See application file for complete search history.

(56) References Cited

U.S. PATENT DOCUMENTS

| | | | |
|---|---|---|---|
| 4,779,378 A | 10/1988 | Mason, Jr. | |
| 5,309,671 A * | 5/1994 | Byun | A01G 9/023 47/71 |
| 5,363,594 A | 11/1994 | Davis | |
| 5,438,797 A | 8/1995 | Lendel | |
| 5,555,676 A | 9/1996 | Lund | |
| 7,943,877 B2 | 5/2011 | Chu | |
| D653,156 S * | 1/2012 | Phelps | D11/143 |
| 10,772,270 B2 * | 9/2020 | Linneberg | A01G 9/022 |
| 2017/0112073 A1 * | 4/2017 | Jimenez Santillana | B65D 21/0209 |
| 2017/0258015 A1 | 9/2017 | Cudmore et al. | |
| 2020/0236864 A1 * | 7/2020 | Henry | A01G 27/003 |

FOREIGN PATENT DOCUMENTS

| | | | | |
|---|---|---|---|---|
| GB | 2147484 A * | 5/1985 | | A01G 9/022 |
| KR | 20010082883 A * | 8/2001 | | |
| KR | 100857740 B1 * | 9/2008 | | |
| KR | 20100006612 U * | 6/2010 | | |
| KR | 20110001647 U * | 2/2011 | | |
| KR | 20120010368 A * | 2/2012 | | |
| KR | 102539608 B1 * | 6/2023 | | |
| SE | 541315 C2 | 6/2019 | | |
| WO | WO-2009154538 A1 * | 12/2009 | | A01C 1/02 |
| WO | WO-2019086242 A1 * | 5/2019 | | A01G 31/02 |
| WO | WO-2020028940 A1 * | 2/2020 | | A01G 31/045 |
| WO | WO-2020076729 A1 * | 4/2020 | | A01G 31/02 |
| WO | WO-2022261699 A1 * | 12/2022 | | |

OTHER PUBLICATIONS

KR 20110001647 U Machine translation (Year: 2011).*

* cited by examiner

*Primary Examiner* — Son T Nguyen
(74) *Attorney, Agent, or Firm* — Cramer Patent & Design, PLLC.; Aaron R. Cramer (57) ABSTRACT

The planter container may be a plurality of interconnecting planter sections comprising a base pot, a double-sided lid, a planter pot, a watering tray, a domed lid, and a pinch grip container. The plurality of interconnecting planter sections may be operable to form an enclosure for a plant. The planter container may be configured to protect the plant as the plant grows from a seed or transplanted seedling through the entire life of the plant. The planter container may be home for the plant from beginning to end—for the life of the plant. The plurality of interconnecting planter sections may provide water to the plant, may support the plant, may permit light to reach the plant, and may be extensible to accommodate growth of the plant. The planter container may further comprise a universal coupling lid for coupling recycled plastic containers.

1 Claim, 8 Drawing Sheets

PLANTER CONTAINER

RELATED APPLICATIONS

None.

FIELD OF THE INVENTION

The present device pertains generally to horticultural equipment, and more particularly to a planter container designed to facilitate the growth of plants, wherein said container is modular in nature, allowing for the interconnection of multiple sections through a threaded design.

BACKGROUND OF THE INVENTION

Typically, traditional planters have a fixed dimension and shape. This design limitation can restrict the development of plants, particularly those whose mature state necessitates deeper or wider soil conditions. In addition, it is common for gardeners to transfer growing plants to larger containers to accommodate their expanding root systems. This procedure can be labor-intensive, disruptive to the plant, and may even cause transplant shock, thereby negatively impacting the plant's health and growth.

Some existing planter designs have provided stacking mechanisms in recognition of the need for scalability. However, these designs often lack stability and the ability to securely interconnect in a seamless manner, leading to potential misalignment or separation of sections, particularly in outdoor environments with variable weather conditions.

In addition, while there are planters that allow for vertical growth, these systems typically require plants to be potted separately, as opposed to sustaining the growth of a single plant across multiple interconnected sections. Thus, there is still a need for a planter container that is both modular and durable, allowing a single plant to develop across multiple interconnected sections.

The present device aims to address the above limitations by providing a modular planter container with a number of threaded interconnecting sections. Each section can be added or removed as required to meet the growth requirements of a single plant, providing a scalable, stable, and seamless design.

SUMMARY OF THE INVENTION

Embodiments of the present disclosure may include a modular planter container device designed to accommodate and facilitate the growth of plants. The foundation of this device is a base pot equipped with a side wall, a bottom wall with water intake apertures for a watering tray, and a coupler with an open top. This base pot integrates with a distinct double-sided lid featuring its own sidewall, a center partition filled with apertures, and two couplers. This structure allows the base pot and double-sided lid to threadingly connect, enabling the combined sections to retain soil, water, and a plant.

Further refinements to the base pot's design include an external threading on its coupler. The double-sided lid, apart from its threading functionality, also acts as a repository for soil and offers openings for root growth. The modular aspect of this device is extended with the introduction of an additional planter pot. This pot, filled with soil, has its own sidewalls, an open top, and open bottom, and is designed to threadingly connect either with the base pot or the double-sided lid. Two embodiments of this pot have been presented, one with internally threaded couplers and the other featuring an externally threaded coupler paired with an internally threaded one.

The design also considers water storage and management. A watering tray, comprised of outer and inner sidewalls and a bottom wall, is designed to threadingly connect to the base pot. This tray has water access points on the inner sidewall and a design feature that allows the base pot to sit elevated, ensuring optimal water intake.

Furthermore, an innovative addition to this modular planter is a domed lid, designed to permit sunlight. This lid can be either transparent or non-opaque. Another unique element is a pinch grip container that makes handling more ergonomic. The system also incorporates a universal coupling lid, enabling the attachment of recycled plastic containers to the main structure, promoting sustainability. This lid possesses a dual-coupling mechanism for diverse attachments.

Addressing different plant growth requirements, the modular sections are available in at least two sizes, ensuring interoperability within the same size category. Explanations are provided about the threading mechanisms, emphasizing both internal and external threads and their purpose. A unique design feature is the double-sided lid's capability to act as a root cutter, simplifying the detachment process of interconnected sections. The watering mechanism ensures that water flows from an outer trough to an inner one, aiding in optimal water absorption. The ultimate purpose of this planter container device is to support a plant's entire life cycle, from a seedling to maturity, by offering adjustable configurations, water, light, and physical support.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

DESCRIPTIVE KEY 100 planter container
200 base pot
202 base pot side wall
204 base pot bottom wall
206 water intake aperture
208 base pot coupler
210 double-sided lid
212 double-sided lid side wall
214 center partition
216 double-sided lid aperture
218 first double-sided lid coupler
220 second double-sided lid coupler
224 first planter pot embodiment
226 second planter pot embodiment
228 third planter pot embodiment
230 universal coupling lid
232 first coupling lid coupler
234 second coupling lid coupler
236 first skirt
238 second skirt
240 planter pot
242 planter pot side wall
244 first planter pot coupler
246 second planter pot coupler
248 lip
250 watering tray
252 watering tray outer side wall
254 watering tray bottom wall
256 watering tray inner side wall
258 water access aperture
260 domed lid
262 domed lid top aperture
264 domed lid coupler
266 outer trough
268 inner trough
270 pinch grip container
272 pinch grip container side wall
274 handle indentation
276 first pinch grip container coupler
278 second pinch grip container coupler
290 first size
292 second size
296 internal thread
298 external thread Description of the Device The present device is directed to a planter container (herein described as the "device") 100. The device 100 may be a plurality of interconnecting planter sections comprising a base pot 200, a double-sided lid 210, a planter pot 240, a watering tray 250, a domed lid 260, and a pinch grip container 270. The plurality of interconnecting planter sections may be operable to form an enclosure for a plant. The device 100 may be configured to protect the plant as the plant grows from a seed or transplanted seedling through the entire life of the plant. The plurality of interconnecting planter sections may provide water to the plant, may support the plant, may permit light to reach the plant, and may be extensible to accommodate growth of the plant.

The base pot 200 may be a hollow cylindrical container comprising a base pot side wall 202, a base pot bottom wall 204, and an open top. The bottom of the base pot 200 may detachably couple to the watering tray 250. The base pot bottom wall 204 may comprise a plurality of water intake apertures 206 for water to enter the base pot 200 from the watering tray 250. The base pot side wall 202 may be coupled to the base pot bottom wall 204. The top of the base pot side wall 202 may comprise a base pot coupler 208 for detachably coupling the base pot 200 to the plurality of interconnecting planter sections located above the base pot 200. The base pot coupler 208 may be externally threaded. The base pot 200 may be filled with soil such that roots of the plant may extend down from the plurality of interconnecting planter sections located above the base pot 200 into the base pot 200 to receive nutrients and water.

Figure 1A:
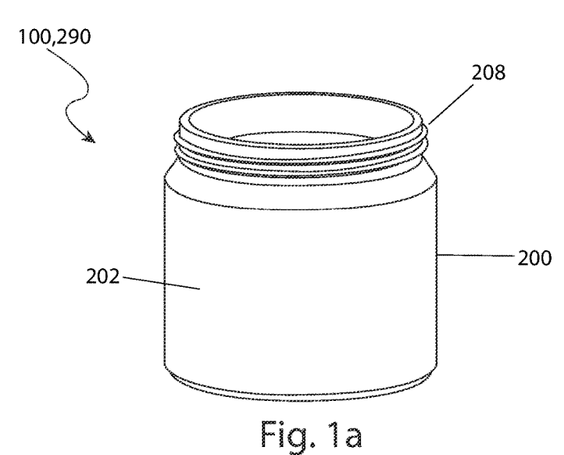
FIG. 1a is a top perspective view of a planter container 100, according to an embodiment of the present device, illustrating the base pot 200 in the first size 290.
Figure 1B:
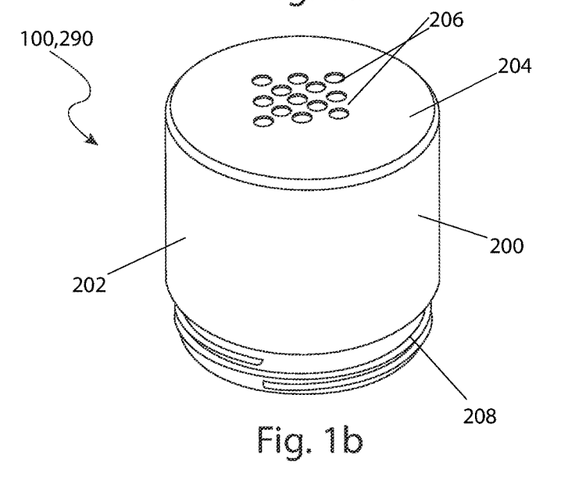
FIG. 1b is a bottom perspective view of a planter container 100, according to an embodiment of the present device, illustrating the base pot 200 in the first size 290.
Figure 2:
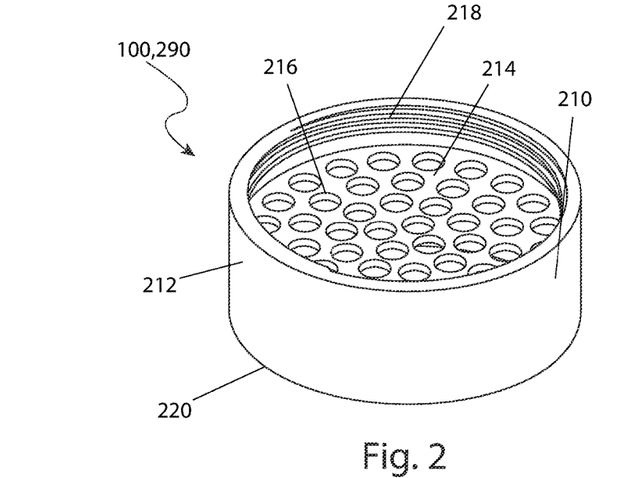
FIG. 2 is a top perspective view of a planter container 100, according to an embodiment of the present device, illustrating the double-sided lid 210 in the first size 290.
Figure 3:
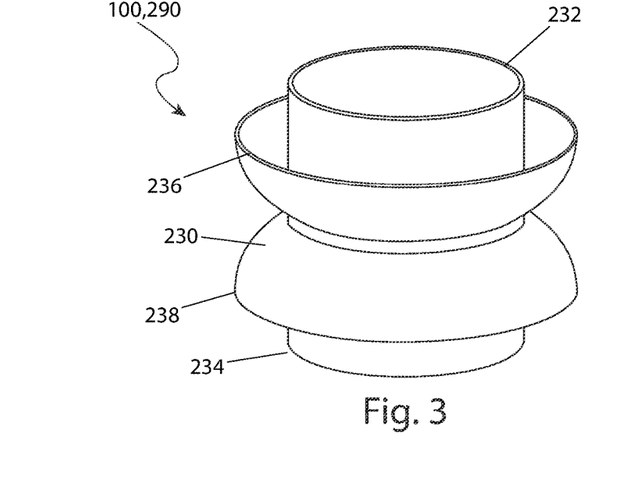
FIG. 3 is a top perspective view of a planter container 100, according to an embodiment of the present device, illustrating the universal coupling lid 230 in the first size 290.
Figure 4:
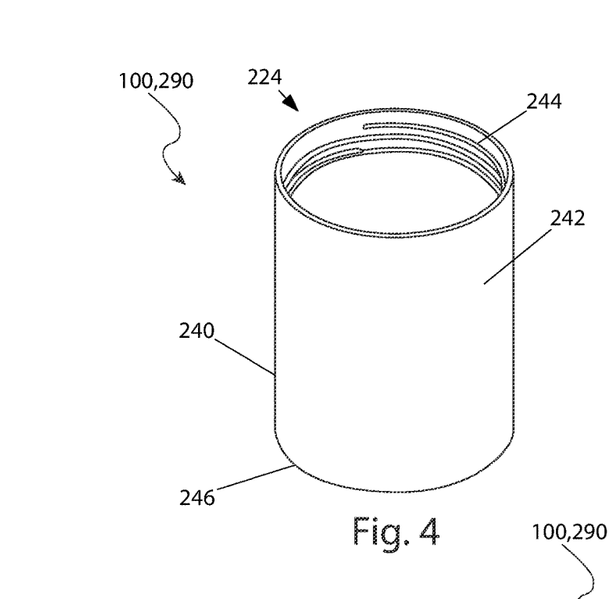
FIG. 4 is a top perspective view of a planter container 100, according to an embodiment of the present device, illustrating the planter pot 240 in the first size 290 with two (2) internally threaded couplers.
Figure 5:
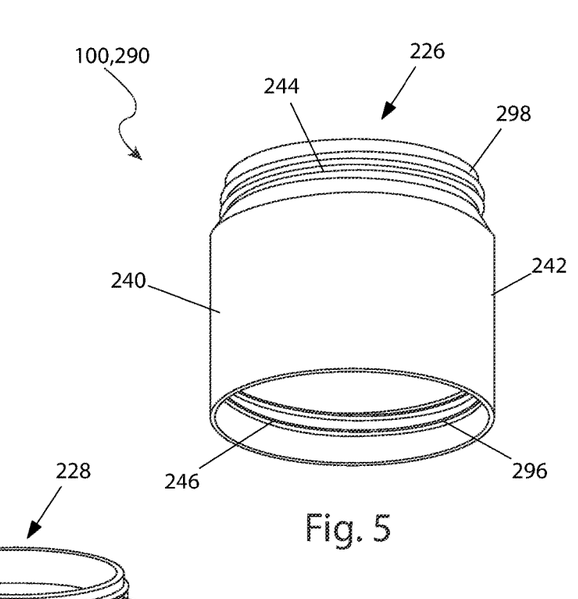
FIG. 5 is a top perspective view of a planter container 100, according to an embodiment of the present device, illustrating the planter pot 240 in the first size 290 with one (1) externally threaded coupler and one (1) internally threaded coupler.
Figure 6:
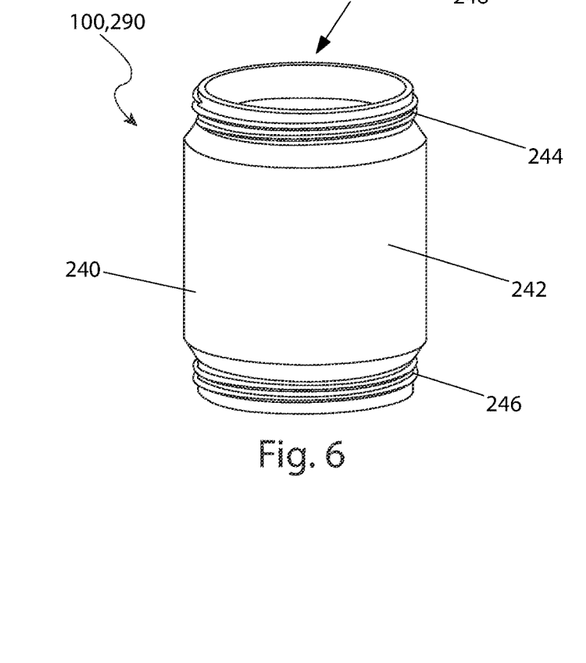
FIG. 6 is a top perspective view of a planter container 100, according to an embodiment of the present device, illustrating the planter pot 240 in the first size 290 with two (2) externally threaded couplers.
Figure 7A:
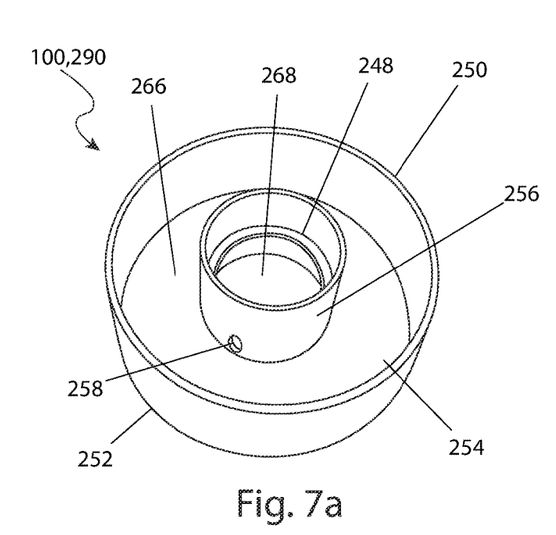
FIG. 7a is a top perspective view of a planter container 100, according to an embodiment of the present device, illustrating the watering tray 250 in the first size 290.
Figure 7B:
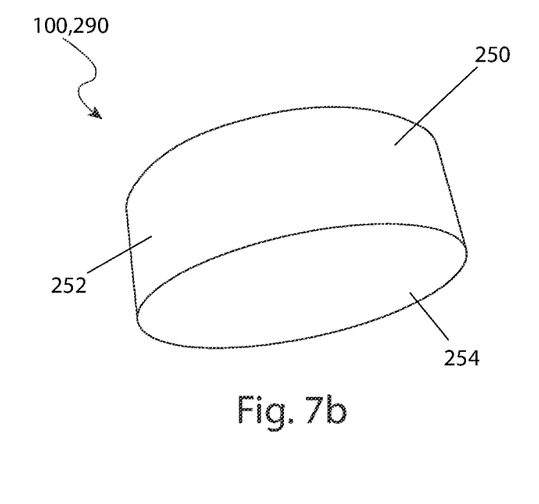
FIG. 7b is a bottom perspective view of a planter container 100, according to an embodiment of the present device, illustrating the watering tray 250 in the first size 290.
Figure 11:
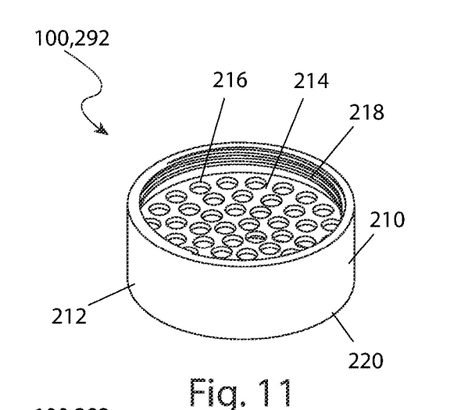
FIG. 11 is a top perspective view of a planter container 100, according to an embodiment of the present device, illustrating the double-sided lid 210 in the second size 292.
Figure 12:
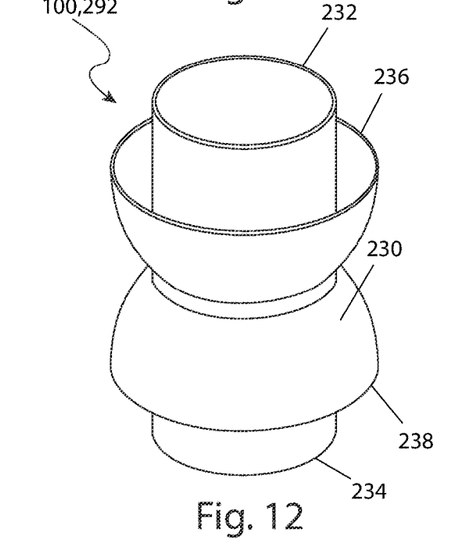
FIG. 12 is a top perspective view of a planter container 100, according to an embodiment of the present device, illustrating the universal coupling lid 230 in the second size 292.
Figure 13:
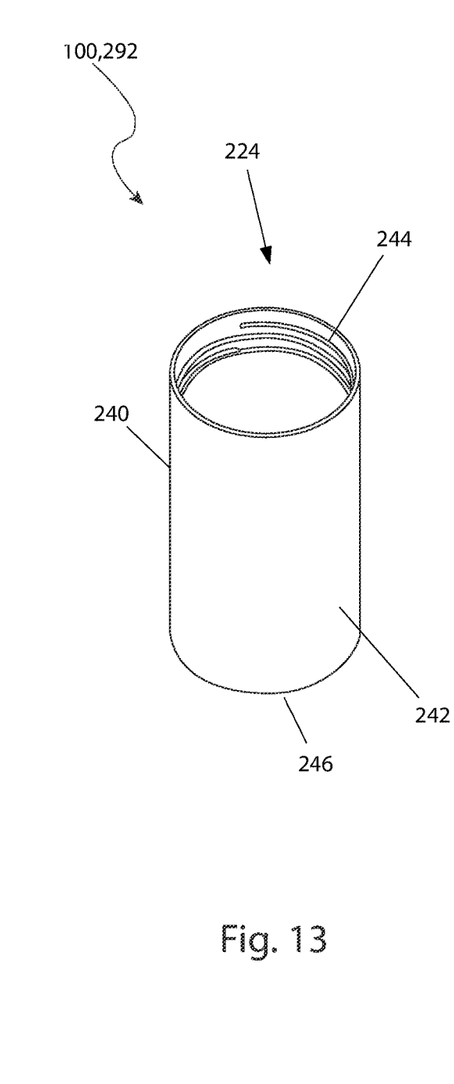
FIG. 13 is a top perspective view of a planter container 100, according to an embodiment of the present device, illustrating the planter pot 240 in the second size 292 with two (2) internally threaded couplers.
Figure 14:
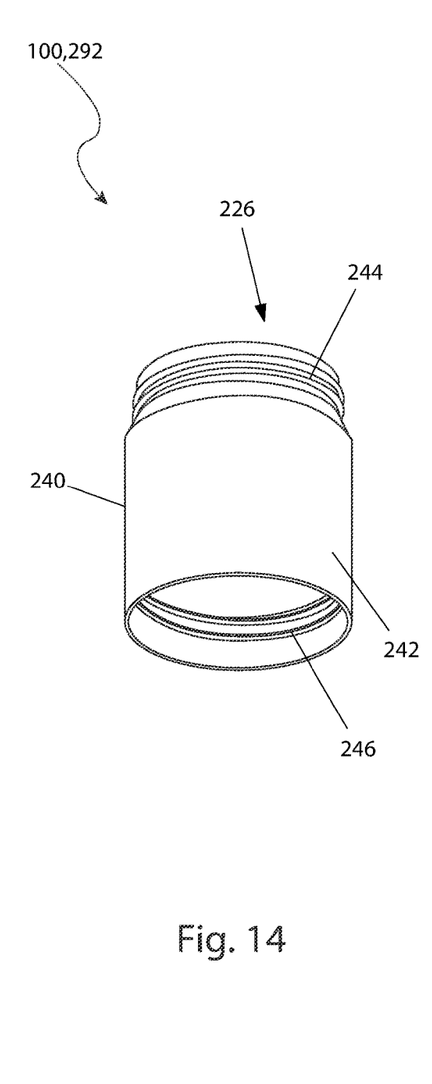
FIG. 14 is a top perspective view of a planter container 100, according to an embodiment of the present device, illustrating the planter pot 240 in the second size 292 with one (1) externally threaded coupler and one (1) internally threaded coupler.
Figure 15:
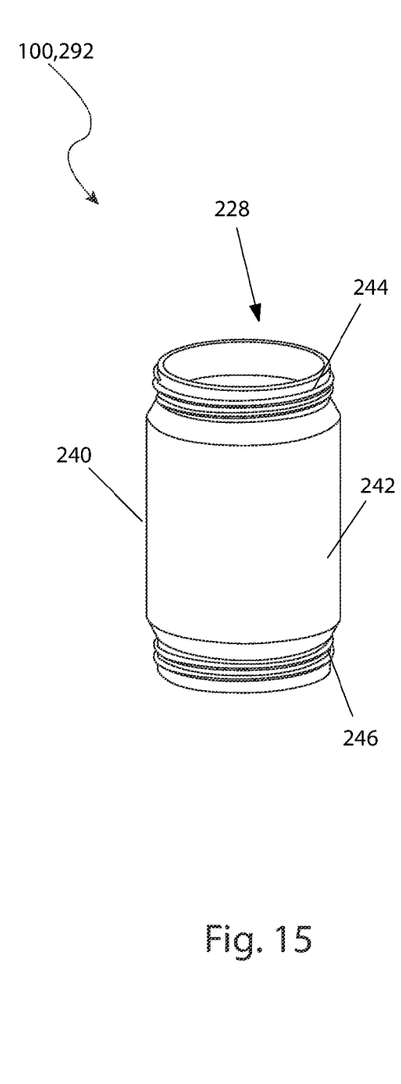
FIG. 15 is a top perspective view of a planter container 100, according to an embodiment of the present device, illustrating the planter pot 240 in the second size 292 with two (2) externally threaded couplers.
Figure 16A:
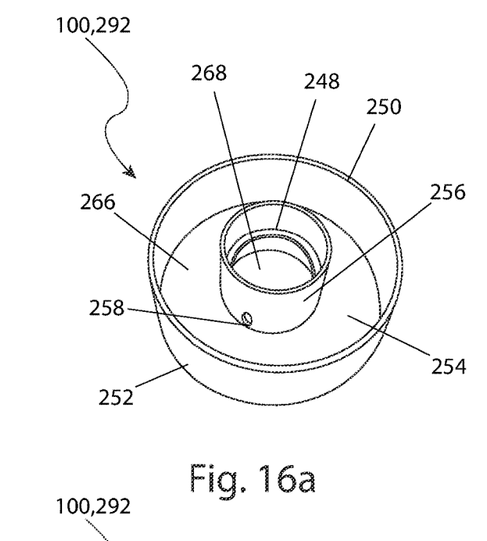
FIG. 16a is a top perspective view of a planter container 100, according to an embodiment of the present device, illustrating the watering tray 250 in the second size 292.
Figure 16B:
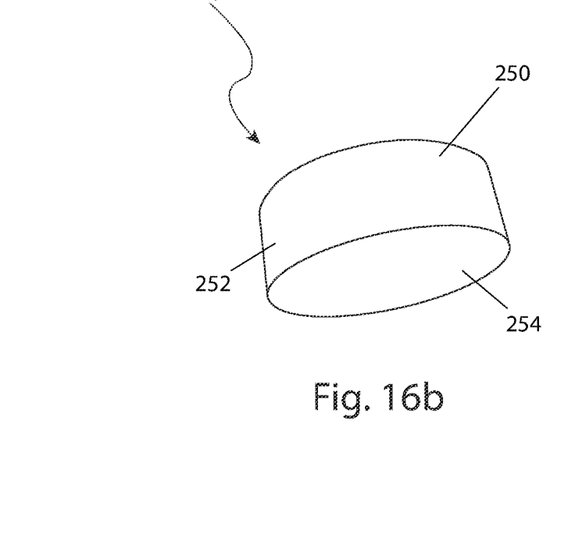
FIG. 16b is a bottom perspective view of a planter container 100, according to an embodiment of the present device, illustrating the watering tray 250 in the second size 292.

The double-sided lid 210 may be a cylindrical coupler comprising a double-sided lid side wall 212, a center partition 214, a first double-sided lid coupler 218, and a second double-sided lid coupler 220. The double-sided lid 210 may couple two (2) of the plurality of interconnecting planter sections to create a larger enclosure. The double-sided lid 210 may be operable to retain the soil that is in the plurality of interconnecting planter sections located above the double-sided lid 210. The center partition 214 may be horizontally-oriented and may comprise a plurality of double-sided lid apertures 216 that the roots of the plant may grow down through. The double-sided lid 210 may be operable as a root cutter in that the plurality of double-sided lid apertures 216 in the center partition 214 may cut the roots as the double-sided lid 210 is twisted to separate the plurality of interconnecting planter sections. The first double-sided lid coupler 218 may be internally threaded and located on at top of the double-sided lid 210. The first double-sided lid coupler 218 may be internally threaded and located on at bottom of the double-sided lid 210. In a preferred embodiment, the double-sided lid 210 may be coupled to the top of the base pot 200 and the planter pot 240 may be coupled to the top of the double-sided lid 210.

The planter pot 240 may be a hollow cylindrical container comprising a planter pot side wall 242, an open top, and an open bottom. The planter pot 240 may detachably couple to the plurality of interconnecting planter sections to extend the height of the enclosure. The planter pot 240 may be filled with the soil to support growth of the plant.

The top of the planter pot 240 may comprise a first planter pot coupler 244 for detachably coupling the planter pot 240 to the plurality of interconnecting planter sections located above the planter pot 240. The first planter pot coupler 244 may be internally threaded or externally threaded. The bottom of the planter pot 240 may comprise a second planter pot coupler 246 for detachably coupling the planter pot 240 to the plurality of interconnecting planter sections located below the planter pot 240. The second planter pot coupler 246 may be internally threaded or externally threaded. In a preferred embodiment, the planter pot 240 may be coupled to the top of the double-sided lid 210 or to the top of another planter pot.

In a first planter pot embodiment 224, the first planter pot coupler 244 may be internally threaded and the second planter pot coupler 246 may be internally threaded. In a second planter pot embodiment 226, the first planter pot coupler 244 may be externally threaded and the second planter pot coupler 246 may be internally threaded. The second planter pot embodiment 226 may be inverted to reverse the couplers. In a third planter pot embodiment 228, the first planter pot coupler 244 may be externally threaded and the second planter pot coupler 246 may be externally threaded.

The watering tray 250 may be a cylindrical double-wall container comprising a watering tray outer side wall 252, a watering tray inner side wall 256, a watering tray bottom wall 254, and an open top. The watering tray outer side wall 252 may surround the perimeter of the watering tray 250 and may be coupled to the watering tray bottom wall 254 to define a well for holding water. The watering tray inner side wall 256 may be concentrically aligned with the watering tray outer side wall 252 and may also be coupled to the watering tray bottom wall 254. The watering tray inner side wall 256 may define an outer trough 266 located between the watering tray outer side wall 252 and the watering tray inner side wall 256 and an inner trough 268 located within the watering tray inner side wall 256. The watering tray inner side wall 256 may comprise one (1) or more water access apertures 258 located at the bottom of the watering tray inner side wall 256 to enable the flow of water from the outer trough 266 into the inner trough 268.

The inside surface of the watering tray inner side wall 256 may comprise a lip 248. The lip 248 may project horizontally towards the center of the watering tray 250. The base pot 200 may be lowered into the inner trough 268 of the watering tray 250 and the bottom of the base pot 200 may be supported by the lip 248 such that a gap is formed under the base pot 200 between the base pot bottom wall 204 and the watering tray bottom wall 254. The base pot 200 may absorb water from the inner trough 268 through the plurality of water intake apertures 206 in the base pot bottom wall 204. As a non-limiting example, water may be poured into the outer trough 266 and may flow through the one (1) or more water access apertures 258 into the inner trough 268 where may the water may be absorbed into the base pot 200 via the plurality of water intake apertures 206.

Figure 8:
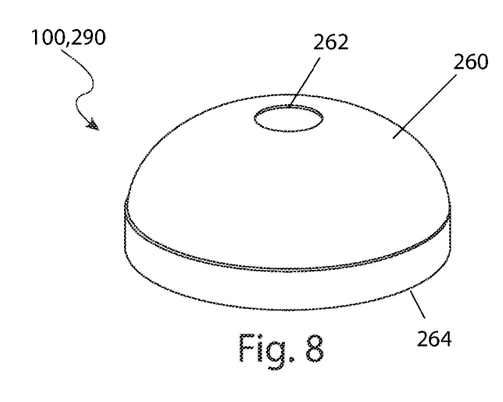
FIG. 8 is a top perspective view of a planter container 100, according to an embodiment of the present device, illustrating the domed lid 260 in the first size 290.
Figure 9:
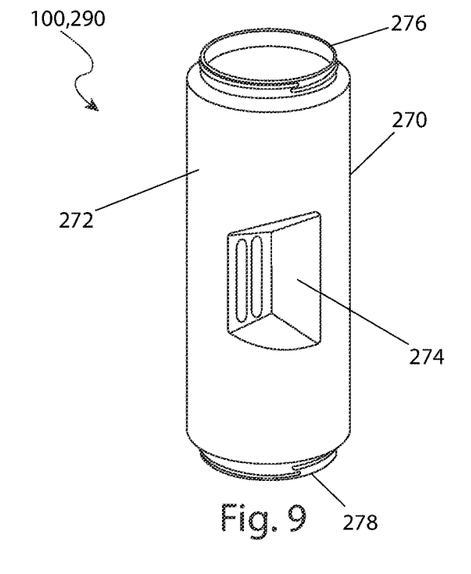
FIG. 9 is a top perspective view of a planter container 100, according to an embodiment of the present device, illustrating the pinch grip container 270 in the first size 290 with two (2) externally threaded couplers.
Figure 10A:
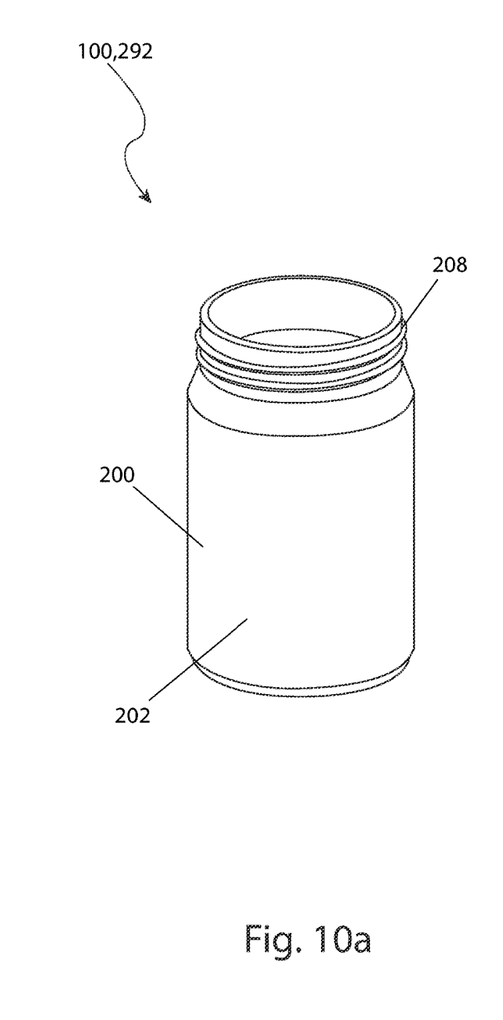
FIG. 10a is a top perspective view of a planter container 100, according to an embodiment of the present device, illustrating the base pot 200 in the second size 292.
Figure 10B:
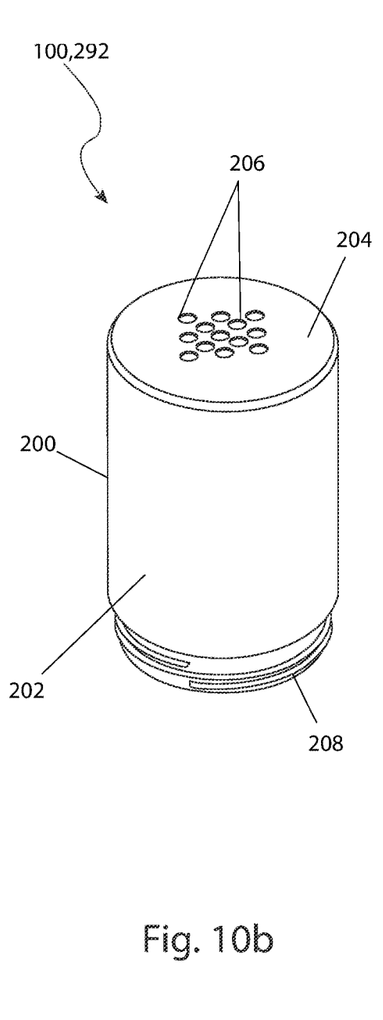
FIG. 10b is a bottom perspective view of a planter container 100, according to an embodiment of the present device, illustrating the base pot 200 in the second size 292.
Figure 17:
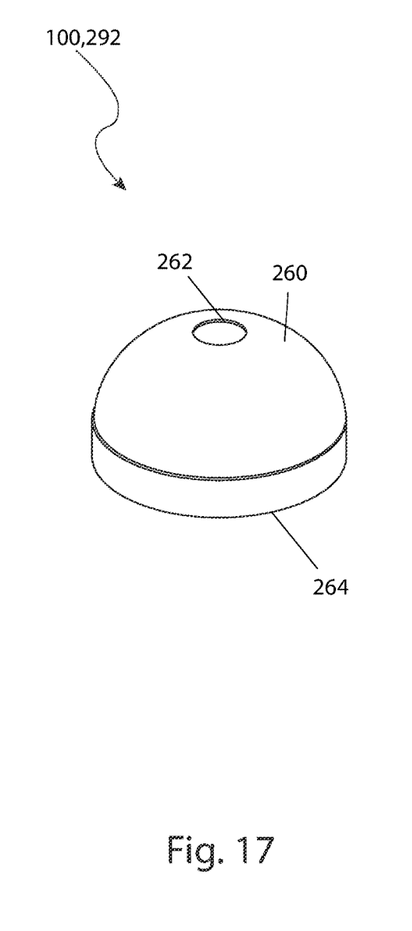
FIG. 17 is a top perspective view of a planter container 100, according to an embodiment of the present device, illustrating the domed lid 260 in the second size 292.
Figure 18:
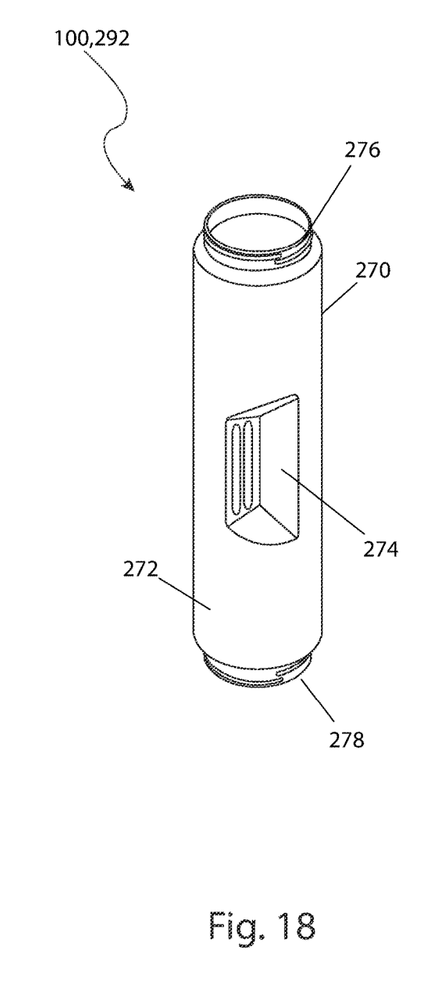
FIG. 18 is a top perspective view of a planter container 100, according to an embodiment of the present device, illustrating the pinch grip container 270 in the second size 292 with two (2) externally threaded couplers.
Figure 19:
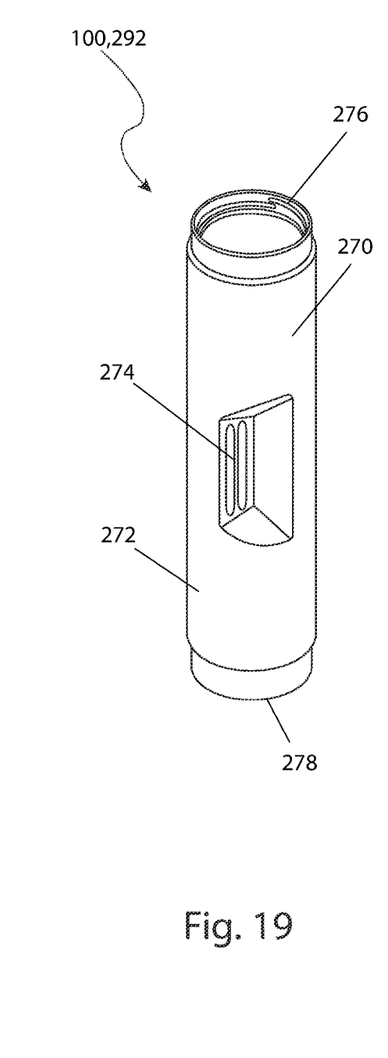
FIG. 19 is a top perspective view of a planter container 100, according to an embodiment of the present device, illustrating the pinch grip container 270 in the second size 292 with two (2) internally threaded couplers.
Figure 20A:
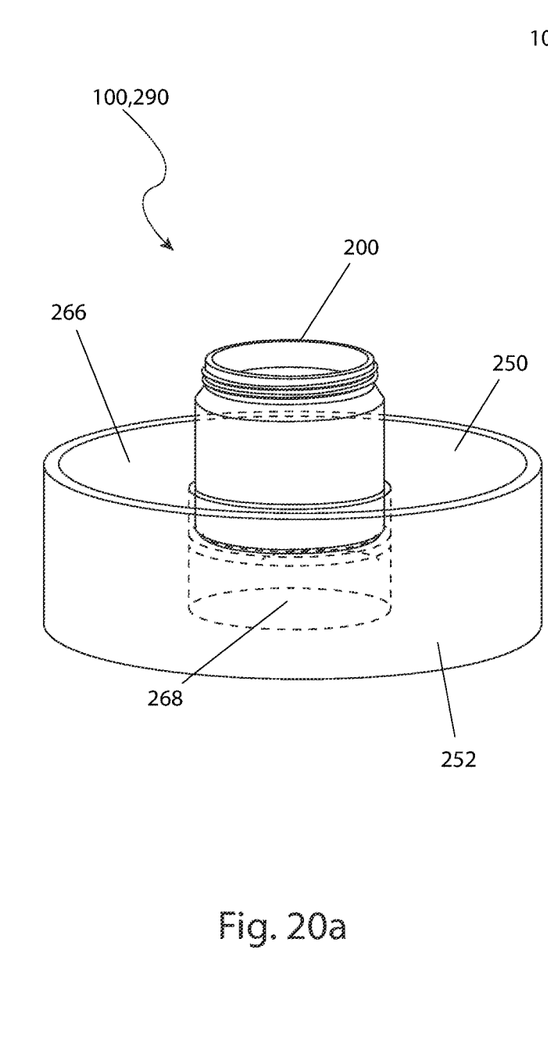
FIG. 20a is an in-use view of a planter container 100, according to an embodiment of the present device, illustrating a base pot 200 in the first size 290 inserted into a watering tray 250.
Figure 20B:
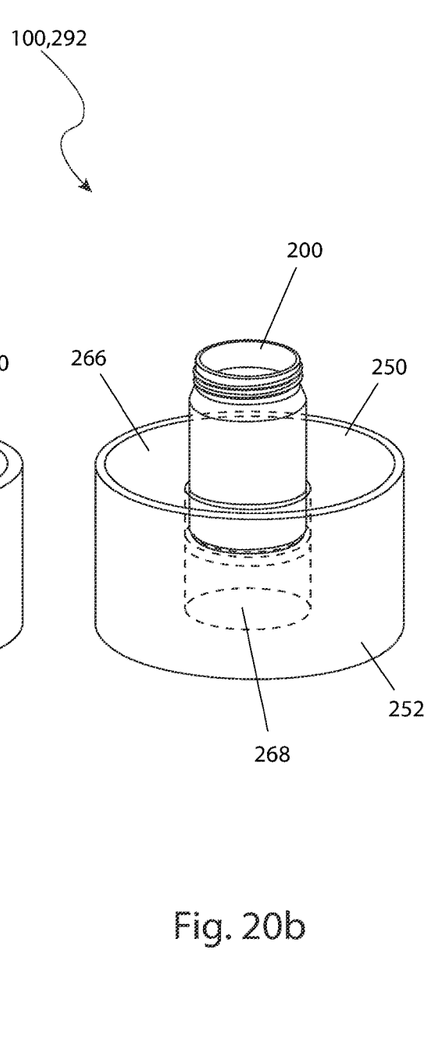
FIG. 20b is an in-use view of a planter container 100, according to an embodiment of the present device, illustrating a base pot 200 in the second size 292 inserted into a watering tray 250.

The domed lid 260 may be a lid in the shape of a hollow spherical cap. The bottom of the domed lid 260 may comprise a domed lid coupler 264 for detachably coupling the domed lid 260 to the top of one of the plurality of interconnecting planter sections. The domed lid coupler 264 may be internally threaded. The top of the domed lid 260 may comprise a domed lid top aperture 262 through which the nutrients and water may be added to the enclosure.

The domed lid 260 may be non-opaque such that the domed lid 260 may pass sunlight into the enclosure. In some embodiments, the domed lid 260 may be transparent. The pinch grip container 270 may be a hollow cylindrical container comprising a pinch grip container side wall 272, an open top, and an open bottom. The pinch grip container 270 may detachably couple to the plurality of interconnecting planter sections to extend the height of the enclosure. The top of the pinch grip container 270 may comprise a first pinch grip container coupler 276 for detachably coupling the planter pot 240 to the plurality of interconnecting planter sections located above the pinch grip container 270. The first pinch grip container coupler 276 may be internally threaded or externally threaded. The bottom of the pinch grip container 270 may comprise a second pinch grip container coupler 278 for detachably coupling the pinch grip container 270 to the plurality of interconnecting planter sections located below the pinch grip container 270. The second pinch grip container coupler 278 may be internally threaded or externally threaded.

The pinch grip container side wall 272 may comprise a pair of handle indentations 274 that may be adapted for a user to grasp while moving the pinch grip container 270. The device 100 may further comprise a universal coupling lid 230. The universal coupling lid 230 may couple a recycled plastic container to the plurality of interconnecting planter sections or may couple the recycled plastic containers to each other. As non-limiting examples, the recycled plastic container may be a peanut butter jar or a mayonnaise jar. The universal coupling lid 230 may comprise a first coupling lid coupler 232 and a first skirt 236 at the top of the universal coupling lid 230. The universal coupling lid 230 may comprise a second coupling lid coupler 234 and a second skirt 238 at the bottom of the universal coupling lid 230. The first coupling lid coupler 232 and the second coupling lid coupler 234 may be internally threaded or unthreaded. The universal coupling lid 230 may couple to the bottom of the recycled plastic container after the bottom of the recycled plastic container has been cut off. As non-limiting examples, the first coupling lid coupler 232 may slide into an opening cut into a first recycled plastic container and the first skirt 236 may extend over the first recycled plastic container, the second coupling lid coupler 234 may slide into an opening cut into a second recycled plastic container and the second skirt 238 may extend over the second recycled plastic container, or both.

The plurality of interconnecting planter sections may be available in multiples sizes. The multiple sizes may comprise a first size 290 and a second size 292. All of the plurality of interconnecting planter sections of the first size 290 may couple to any of the plurality of interconnecting planter sections of the first size 290. All of the plurality of interconnecting planter sections of the second size 292 may couple to any of the plurality of interconnecting planter sections of the second size 292.

As a non-limiting example, the diameter of the plurality of interconnecting planter sections of the first size 290 may be five inches with an error of one inch (5.0+/−1.0 in.) and the diameter of the plurality of interconnecting planter sections of the second size 292 may be three inches with an error of one inch (3.0+/−1.0 in.).

As used herein, "externally threaded" may refer to an external thread 298 located on the outside of the wall of one (1) of the plurality of interconnecting planter sections and "internally threaded" may refer to an internal thread 296 located on the inside of the wall of one (1) of the plurality of interconnecting planter sections. Internally threaded couplers and externally threaded couplers of the same size may be complementary, meaning that the gender, handedness, form, angle, pitch, diameter, and thread depth of both threads are compatible for the parts to mate by screwing the threads together. As a non-limiting example, an internally threaded coupler of the first size 290 may mate with an externally threaded coupler of the first size 290 by aligning the couplers and screwing the couplers together.

Figure 21A:
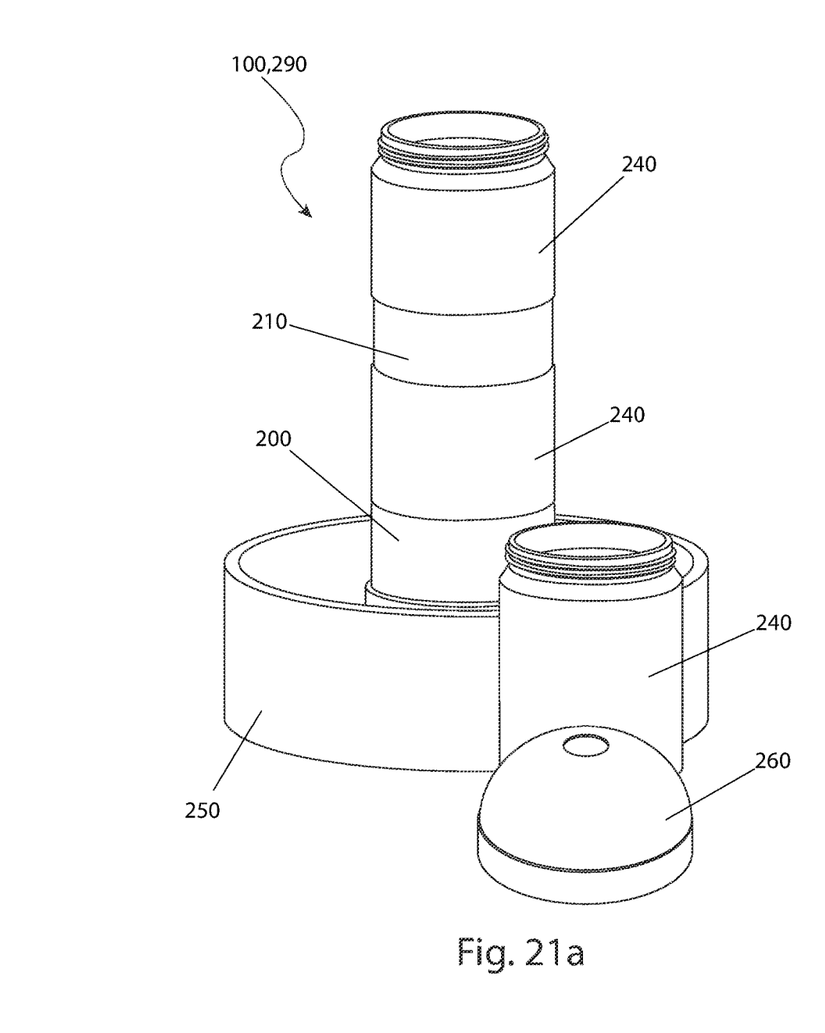
FIG. 21a is an in-use view of a planter container 100, according to an embodiment of the present device, illustrating a stack of the plurality of interconnecting planter sections inserted into a watering tray 250 in the first size 290 with a planter pot 240 and a domed lid 260 available to add to the top of the stack; and, FIG. 21b is an in-use view of a planter container 100, according to an embodiment of the present device, illustrating a stack of the plurality of interconnecting planter sections inserted into a watering tray 250 in the second size 292 with a planter pot 240 and a domed lid 260 available to add to the top of the stack.
Figure 21B:
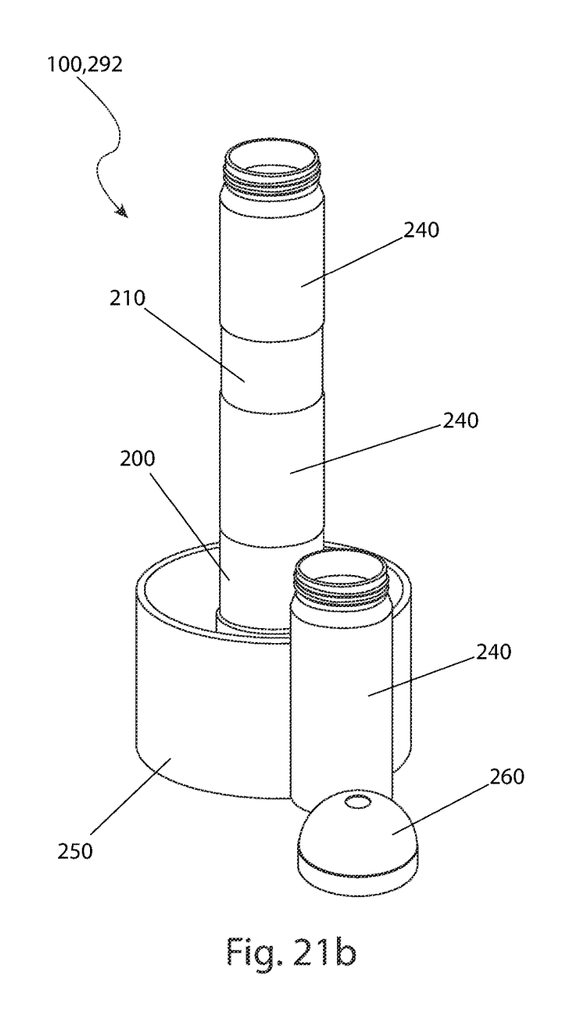

In use, the user may form an enclosure for a plant by placing soil into the base pot 200, coupling the double-sided lid 210 to the top of the base pot 200, coupling the planter pot 240 to the top of the double-sided lid 210, placing more of the soil into the planter pot 240, and placing one (1) or more seeds or a seedling into the soil located in the planter pot 240. The base pot 200 may then be lowered into the inner trough 268 of the watering tray 250 and water may be poured into the outer trough 266 of the watering tray 250. Additional sections of the plurality of interconnecting planter sections may be coupled to the top or bottom to provide more room for root growth and/or protection for the plant as it grows upwards. The device 100 may protect the plant as the plant is transported. As a non-limiting example, the device 100 may be used in schools to enable students to start and raise the plant and to eventually transport the plant home with minimal damage.

The exact specifications, materials used, and method of use of the device 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A modular planter container consisting of:
    a base pot defined by a hollow cylindrical shape including a base pot side wall and a base pot bottom wall, the base pot bottom wall including a plurality of water intake apertures;
    a double-sided lid configured to detachably couple to a top of the base pot, the double-sided lid consisting of a double-sided lid side wall, a horizontally-oriented center partition including a plurality of double-sided lid apertures, a first double-sided lid coupler having internal threads located at the top of the double-sided lid, and a second double-sided lid coupler having internal threads located at the bottom of the double-sided lid;
    a planter pot configured to detachably couple to the top of the double-sided lid, the planter pot defined by a hollow cylindrical shape including a planter pot side wall, a first planter pot coupler located at the top of the planter pot, and a second planter pot coupler located at the bottom of the planter pot, where both the first and second planter pot couplers are configured to be either internally threaded or externally threaded;
    a watering tray positioned below the base pot, the watering tray consisting of an outer side wall, an inner side wall defining an inner trough and an outer trough, and a watering tray bottom wall, the inner side wall including one or more water access apertures at the bottom to facilitate water flow between the outer trough and the inner trough, and a lip protruding horizontally towards the center from the inner side wall to support the base pot above the watering tray bottom wall;
    a domed lid configured to detachably couple to the top of the planter pot, the domed lid consisting of a hollow spherical cap shape with a domed lid top aperture, and a domed lid coupler having internal threads at the bottom of the domed lid;
    a pinch grip container configured to extend a height of an enclosure, consisting of a pinch grip container side wall, a first pinch grip container coupler at the top, and a second pinch grip container coupler at the bottom, both couplers configured to be either internally threaded or externally threaded, and a pair of handle indentations on the pinch grip container side wall; and,
    a universal coupling lid adapted to couple a cut-open recycled plastic container to the modular planter container, the universal coupling lid consisting of a first coupling lid coupler and a first skirt at the top, and a second coupling lid coupler and a second skirt at the bottom, where both couplers are configured to be internally threaded or unthreaded; and, wherein the planter container is configured such that all elements are interchangeable and configured to couple in multiple configurations to accommodate plant growth; and, wherein the container is adaptable to two predefined sizes based on a dimension and a threading of the couplers.

* * * * *